(12) United States Patent
Eronen et al.

(10) Patent No.: US 12,231,866 B2
(45) Date of Patent: Feb. 18, 2025

(54) APPARATUS AND ASSOCIATED METHODS FOR CAPTURE OF SPATIAL AUDIO

(71) Applicant: Nokia Technologies Oy, Espoo (FI)

(72) Inventors: Antti Johannes Eronen, Tampere (FI); Arto Juhani Lehtiniemi, Lempäälä (FI); Miikka Tapani Vilermo, Siuro (FI); Mikko-Ville Ilari Laitinen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 266 days.

(21) Appl. No.: 17/608,633

(22) PCT Filed: May 11, 2020

(86) PCT No.: PCT/EP2020/062987
§ 371 (c)(1),
(2) Date: Nov. 3, 2021

(87) PCT Pub. No.: WO2020/234015
PCT Pub. Date: Nov. 26, 2020

(65) Prior Publication Data
US 2022/0225049 A1    Jul. 14, 2022

(30) Foreign Application Priority Data

May 20, 2019   (EP) .................................... 19175422

(51) Int. Cl.
*H04S 7/00*      (2006.01)
*G06F 3/04883*   (2022.01)
(Continued)

(52) U.S. Cl.
CPC .......... *H04S 7/302* (2013.01); *G06F 3/04883* (2013.01); *H04R 3/005* (2013.01);
(Continued)

(58) Field of Classification Search
CPC .. H04S 2400/01; H04S 2420/01; H04S 7/302; H04S 7/40; G06F 3/04883;
(Continued)

(56) References Cited

U.S. PATENT DOCUMENTS

2009/0002490 A1 *  1/2009  Saito ...................... H04N 7/181
                                                                    348/143
2009/0015658 A1    1/2009  Enstad et al.
(Continued)

FOREIGN PATENT DOCUMENTS

CN      107925712 A      4/2018
EP        2824663   *    1/2015
(Continued)

OTHER PUBLICATIONS

Office action received for corresponding Japanese Patent Application No. 2021-569318, dated Mar. 1, 2023, 3 pages of office action and 2 pages of translation available.
(Continued)

*Primary Examiner* — William A Jerez Lora
(74) *Attorney, Agent, or Firm* — ALSTON & BIRD LLP (57) ABSTRACT

An apparatus configured to: receive spatial audio data comprising audio captured from a space extending around a capture device and directional information; receive video imagery captured by a camera, wherein the extent of the space from which the spatial audio data is captured is greater than the field of view of the camera; associate each audio sources determined from the directional information, with, for audio sources within the field of view, a region of the video imagery that corresponds to the direction towards the audio source, and, for audio sources outside the field of view, a part of an out-of-view graphic, the out-of-view graphic indicative of the spatial extent of the space outside the field of view; display the video imagery and the out-of-
(Continued)

view graphic; receive user input; and provide for control of at least one audio capture property of a selected one of said one or more audio sources.

20 Claims, 4 Drawing Sheets

(51) Int. Cl.
    *H04R 3/00*            (2006.01)
    *H04R 5/04*            (2006.01)

(52) U.S. Cl.
    CPC ............... *H04R 5/04* (2013.01); *H04S 7/40* (2013.01); *G06F 2203/04808* (2013.01); *H04R 2203/12* (2013.01); *H04S 2400/01* (2013.01); *H04S 2420/01* (2013.01)

(58) Field of Classification Search
    CPC . G06F 2203/04808; H04R 3/005; H04R 5/04; H04R 2203/12
    USPC ...................................... 381/56, 58, 303, 306
    See application file for complete search history.

(56) References Cited

U.S. PATENT DOCUMENTS

| | | | |
|---|---|---|---|
| 2009/0167700 A1* | 7/2009 | Westerman | G06F 3/04812 345/173 |
| 2010/0125352 A1* | 5/2010 | Yamada | G10L 21/0272 706/12 |
| 2014/0172432 A1 | 6/2014 | Sendai | |
| 2015/0016641 A1 | 1/2015 | Ugur et al. | |
| 2016/0080684 A1 | 3/2016 | Farrell et al. | |
| 2016/0295323 A1 | 10/2016 | Yliaho et al. | |
| 2016/0299738 A1* | 10/2016 | Mäkinen | G06F 3/04883 |
| 2017/0188140 A1 | 6/2017 | Duzinkiewicz et al. | |
| 2019/0139312 A1 | 5/2019 | Leppanen et al. | |
| 2019/0220248 A1* | 7/2019 | Cordourier Maruri | G06F 3/167 |

FOREIGN PATENT DOCUMENTS

| | | |
|---|---|---|
| EP | 2824663 A2 | 1/2015 |
| JP | 2013-106298 A | 5/2013 |
| JP | 2016-144044 A | 8/2016 |
| JP | 2016-146547 A | 8/2016 |
| JP | 2016-178652 A | 10/2016 |

OTHER PUBLICATIONS

Extended European Search Report received for corresponding European Patent Application No. 19175422.5, dated Nov. 8, 2019, 10 pages.

International Search Report and Written Opinion received for corresponding Patent Cooperation Treaty Application No. PCT/EP2020/062987, dated Jun. 15, 2020, 14 pages.

Office action received for corresponding European Patent Application No. 19175422.5, dated Sep. 20, 2021, 7 pages.

Office action received for corresponding Japanese Patent Application No. 2021-569318, dated Sep. 28, 2023, 2 pages of office action and no page of translation available.

Office Action for Chinese Application No. 202080037691.6 dated Nov. 27, 2024, 18 pages.

\* cited by examiner

APPARATUS AND ASSOCIATED METHODS FOR CAPTURE OF SPATIAL AUDIO

RELATED APPLICATION

This application claims priority to PCT Application No. PCT/EP2020/062987, filed on May 11, 2020, which claims priority to European Application No. 19175422.5, filed on May 20, 2019, each of which is incorporated herein by reference in its entirety.

TECHNICAL FIELD

The present disclosure relates to the field of capture of spatial audio. In particular, it is related to the presentation of a user interface that provides for modification of one or more audio capture properties of spatial audio, associated apparatus, methods and computer programs.

BACKGROUND

The capture of spatial audio may be useful and the control of said capture may be difficult.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising means configured to:
receive spatial audio data comprising audio captured from one or more audio sources in a space extending around a capture device and directional information indicative of at least the direction towards said one or more audio sources, wherein the spatial audio data is captured by said capture device;
receive video imagery captured by a camera of the capture device, the video imagery having a field of view, wherein the extent of the space from which the spatial audio data is captured is greater than the field of view;
associate each of the one or more audio sources, determined from the directional information, with, for audio sources within the field of view, a region of the video imagery that corresponds to the direction towards the audio source, and, for audio sources outside the field of view, a part of an out-of-view graphic that corresponds to the direction towards the audio source, the out-of-view graphic indicative of the spatial extent of the space outside the field of view;
provide for display of the video imagery on a display along with the out-of-view graphic;
receive user input to select a region of the video imagery or a part of the out-of-view graphic;
provide for control of at least one audio capture property of a selected one of said one or more audio sources, wherein said selected one of said one or more audio source comprises one of the one or more audio sources that is associated with the region or part selected by the user input.

In one or more examples, the means are configured to provide for display of a marker at one or more (e.g. both) of:

the part or parts of the out-of-view graphic that correspond to the direction or directions towards the one or more audio sources; and
the region or regions of the video imagery that correspond to the direction or directions towards the one or more audio sources.

In one or more examples, the control of at least one audio capture property comprises the means being configured to provide signalling to cause the capture or recordal of the selected one audio source using a beam forming technique.

In one or more examples, the control of at least one audio capture property comprises the means being configured to, at least one of:
capture or record the selected one audio source with a greater volume gain relative to a volume gain applied to other audio of the spatial audio data;
capture or record the selected one audio source with a greater quality relative to a quality applied to other audio of the spatial audio data; or capture or record the audio of the selected one audio source as an audio stream separate from other audio of the spatial audio data.

In one or more examples, the means are configured to determine the one or more audio sources by determining from which direction, using the directional information, audio that has a volume above a predetermined threshold is received.

In one or more examples, the out-of-view graphic indicative of the spatial extent of the space outside the field of view comprises at least one of:
a line wherein the position along the line from one end thereof to the other represents the direction from which the audio of the audio source is received from a direction that corresponds to at least a first edge of the field of view to a direction that corresponds to at least a second edge of the field of view opposite the first edge; or
a sector of an ellipse wherein the position within the sector represents the direction from which the audio of the audio source is received from a direction that corresponds to at least a first edge of the field of view to a direction that corresponds to at least a second edge of the field of view opposite the first edge.

In one or more examples, the out-of-view graphic indicative of the spatial extent of the space outside the field of view is representative of a plane around the capture device wherein a position of a presented marker relative to the out-of-view graphic represents an azimuth direction from which the audio of the audio source is received and wherein a position of the marker depicted a distance above or below the out-of-view graphic corresponds to an elevation direction from which the audio of the audio source is received above or below said plane.

In one or more examples, the out-of-view graphic indicative of the spatial extent of the space outside the field of view comprises a line wherein the position along the line from one end thereof to the other represents an azimuth direction from which the audio of the audio source is received from an azimuth direction that corresponds to at least a first edge of the field of view to an azimuth direction that corresponds to at least a second edge of the field of view opposite the first edge and wherein a distance above or below the line corresponds to an elevation direction from which the audio of the audio source is received.

In one or more examples, the means are configured to, based on the user input comprising a tap on a touch sensitive input device at a location that selects the region of the video imagery or the part of the out-of-view graphic, provide for control of at least one audio capture property by modifying said audio capture property by application of a beam forming technique that focusses on the region of the space corresponding to the selected region or part.

In one or more examples, the means are configured to, based on the user input comprising a pinch gesture on a touch sensitive input device at a location that selects the region of the video imagery or the part of the out-of-view graphic, provide for control of at least one audio capture property by modifying said audio capture property by application of a beam forming technique having a degree related to a size of the pinch gesture.

In one or more examples, the means are configured to, based on the received user input selecting a region of the video imagery or a part of the out-of-view graphic where there is not an associated audio source, provide for display of a second marker to indicate the absence of an audio source in the direction that corresponds to the selected region of the video imagery or a part of the out-of-view graphic.

In one or more examples, the beam forming technique comprises at least one of: a delay-sum beamformer technique or a parametric spatial audio processing technique in which the audio of the selected audio source is emphasized.

In one or more examples, the means is configured to provide for one or more (e.g. both) of presentation and recordal of the spatial audio data with the selected audio source having the controlled audio capture property.

In one or more examples, the means of the apparatus comprises at least one processor; and at least one memory including computer program code, the at least one memory and the computer program code configured to, with the at least one processor, cause the apparatus to perform the functionality of the first aspect.

In a second example aspect there is provided an electronic device comprising the apparatus of the first aspect, a camera configured to capture the video imagery, a plurality of microphones configured to capture the spatial audio data, and a display for use by the apparatus to display the video imagery along with the out-of-view graphic.

In a third example aspect there is provided method, the method comprising:
  receiving spatial audio data comprising audio captured from one or more audio sources in a space extending around a capture device and directional information indicative of at least the direction towards said one or more audio sources, wherein the spatial audio data is captured by said capture device;
  receiving video imagery captured by a camera of the capture device, the video imagery having a field of view, wherein the extent of the space from which the spatial audio data is captured is greater than the field of view;
  associating each of the one or more audio sources, determined from the directional information, with, for audio sources within the field of view, a region of the video imagery that corresponds to the direction towards the audio source, and, for audio sources outside the field of view, a part of an out-of-view graphic that corresponds to the direction towards the audio source, the out-of-view graphic indicative of the spatial extent of the space outside the field of view;
  providing for display of the video imagery on a display along with the out-of-view graphic;
  receiving user input to select a region of the video imagery or a part of the out-of-view graphic;
  providing for control of at least one audio capture property of a selected one of said one or more audio sources, wherein said selected one of said one or more audio source comprises one of the one or more audio sources that is associated with the region or part selected by the user input.

In one or more examples, the method comprises providing for display of a marker at one or both of:
  the part or parts of the out-of-view graphic that correspond to the direction or directions towards the one or more audio sources; and
  the region or regions of the video imagery that correspond to the direction or directions towards the one or more audio sources.

In one or more examples, the control of at least one audio capture property comprises the method providing signalling to cause the capture or recordal of the selected one audio source using a beam forming technique.

In one or more examples, the control of at least one audio capture property comprises the method of performing at least one of:
  capturing or recording the selected one audio source with a greater volume gain relative to a volume gain applied to other audio of the spatial audio data;
  capturing or recording the selected one audio source with a greater quality relative to a quality applied to other audio of the spatial audio data; or
  capturing or recording the audio of the selected one audio source as an audio stream separate from other audio of the spatial audio data.

In one or more examples, the method includes determining the one or more audio sources by determining from which direction, using the directional information, audio that has a volume above a predetermined threshold is received.

In one or more examples, the method comprises receiving user input comprising a tap on a touch sensitive input device at a location that selects the region of the video imagery or the part of the out-of-view graphic, and providing for control of at least one audio capture property by modifying said audio capture property by application of a beam forming technique that focusses on the region of the space corresponding to the selected region or part.

In one or more examples, the method comprises receiving the user input comprising a pinch gesture on a touch sensitive input device at a location that selects the region of the video imagery or the part of the out-of-view graphic, and providing for control of at least one audio capture property by modifying said audio capture property by application of a beam forming technique having a degree related to a size of the pinch gesture.

In one or more examples, the method comprises receiving user input that selects a region of the video imagery or a part of the out-of-view graphic where there is not an associated audio source, and providing for display of a second marker to indicate the absence of an audio source in the direction that corresponds to the selected region of the video imagery or a part of the out-of-view graphic.

In one or more examples, the method comprises providing for one or both of presentation and recordal of the spatial audio data with the selected audio source having the controlled audio capture property.

In a fourth example aspect there is provided a computer readable medium comprising computer program code stored thereon, the computer readable medium and computer program code being configured to, when run on at least one processor, perform the method of:

receiving spatial audio data comprising audio captured from one or more audio sources in a space extending around a capture device and directional information indicative of at least the direction towards said one or more audio sources, wherein the spatial audio data is captured by said capture device;

receiving video imagery captured by a camera of the capture device, the video imagery having a field of view, wherein the extent of the space from which the spatial audio data is captured is greater than the field of view;

associating each of the one or more audio sources, determined from the directional information, with, for audio sources within the field of view, a region of the video imagery that corresponds to the direction towards the audio source, and, for audio sources outside the field of view, a part of an out-of-view graphic that corresponds to the direction towards the audio source, the out-of-view graphic indicative of the spatial extent of the space outside the field of view;

providing for display of the video imagery on a display along with the out-of-view graphic;

receiving user input to select a region of the video imagery or a part of the out-of-view graphic;

providing for control of at least one audio capture property of a selected one of said one or more audio sources, wherein said selected one of said one or more audio source comprises one of the one or more audio sources that is associated with the region or part selected by the user input.

In a fourth example aspect there is provided an apparatus comprising:

at least one processor; and at least one memory including computer program code, the at least one memory and the computer program code configured to, with the at least one processor, cause the apparatus to perform at least the following:

receive spatial audio data comprising audio captured from one or more audio sources in a space extending around a capture device and directional information indicative of at least the direction towards said one or more audio sources, wherein the spatial audio data is captured by said capture device;

receive video imagery captured by a camera of the capture device, the video imagery having a field of view, wherein the extent of the space from which the spatial audio data is captured is greater than the field of view;

associate each of the one or more audio sources, determined from the directional information, with, for audio sources within the field of view, a region of the video imagery that corresponds to the direction towards the audio source, and, for audio sources outside the field of view, a part of an out-of-view graphic that corresponds to the direction towards the audio source, the out-of-view graphic indicative of the spatial extent of the space outside the field of view;

provide for display of the video imagery on a display along with the out-of-view graphic;

receive user input to select a region of the video imagery or a part of the out-of-view graphic;

provide for control of at least one audio capture property of a selected one of said one or more audio sources, wherein said selected one of said one or more audio source comprises one of the one or more audio sources that is associated with the region or part selected by the user input.

The optional features of the first aspect apply equally to the apparatus of the fourth aspect. Further, the functionality provided by the optional features of the first aspect may be performed by the method of the second aspect and the code of the computer readable medium of the third aspect.

The present disclosure includes one or more corresponding aspects, examples or features in isolation or in various combinations whether or not specifically stated (including claimed) in that combination or in isolation. Corresponding means and corresponding functional units (e.g., function enabler, AR/VR graphic renderer, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

The capture of spatial audio may be useful for providing a wealth of different user experiences such as in the fields of virtual reality, augmented reality, communication and video capture. Accordingly, the number of devices capable of capturing spatial audio is likely to increase. Given that spatial audio comprises capturing audio with directional information indicative of the direction towards one or more sources of the audio or, put another way, the direction of arrival of that audio from one or more sources of audio, the effective capture of such audio may be complex. It may be desirable to provide for control of one or more audio capture properties of the spatial audio content in an efficient way despite possible limitations of the device that captures said spatial audio.

Spatial audio comprises audio captured, such as by a spatial audio capture device, with directional information. Thus, captured spatial audio may have information representing the audio itself along with information indicative of the spatial arrangement of sources of that audio in a space around the spatial audio capture device. Spatial audio may be presented in such a way to a user that each audio source can be perceived to originate from a particular location, as if the individual sources of the audio were located at those particular locations. Spatial audio data comprises audio for presentation as spatial audio and, as such, typically comprises the audio and the directional information, either explicitly specified as metadata, for example, or inherently present in the way the audio is captured. The spatial audio data can be presented such that its component audio (e.g. sources of audio in a space that are captured) is perceived to originate from one or more points or one or more directions in accordance with the directional information. The audio rendering may take into account early reflections and reverberation which may be modelled, for example, according to the virtual or real space in which the audio presentation takes place.

The spatial audio that is captured may be parametric spatial audio, such as DirAC or first- or higher-order Ambisonics (FOA, HOA). The capture of the spatial audio data may be provided by use of several microphones (such as at least three). Parametric spatial audio capture processing may be used in one or more examples. Parametric spatial audio capture, as will be known to those skilled in the art, may comprise, for each time-frequency tile of captured multi-microphone signal the analysis of sufficient spatial parameters to represent perceptually relevant properties of the signal. These can include, for example, the direction of arrival and ratio parameters such as diffuseness for each time-frequency tile. The spatial audio signal can then be represented with the directional information (e.g. spatial metadata) which may include transport signals formed from the multi-microphone input signals. During rendering, the transport audio signals are used to synthesize, along with the directional information, a sound field which creates an audible percept similar to the one as if the listener would have had his head at the location of the microphone arrangement.

The spatial positioning of the spatial audio may be provided by 3D audio effects, such as those that utilise a head related transfer function to create a spatial audio space (aligned with a real-world space in the case of augmented reality) in which audio can be positioned for presentation to a user. Spatial audio may be presented by headphones by using head-related-transfer-function (HRTF) filtering techniques or, for loudspeakers, by using vector-base-amplitude panning techniques to position the perceived aural origin of the audio content. Spatial audio may use one or more of volume differences, timing differences and pitch differences between audible presentation to each of a user's ears to create the perception that the origin of the audio is at a particular location or in a particular direction in space (e.g. not necessarily aligned with a speaker). The perceived distance to the perceived origin of the audio may be rendered by controlling the amount of reverberation and gain to indicate closeness or distance from the perceived source of the spatial audio. It will be appreciated that spatial audio presentation as described herein may relate to the presentation of audio with only a perceived direction towards its origin as well as the presentation of audio such that the origin of the audio has a perceived location, e.g., including a perception of distance from the user.

Virtual reality (VR) content may be provided with spatial audio having directional properties, such that the audio is perceived to originate from a point in the VR space, which may be linked to the imagery of the VR content. Augmented or mixed reality content may be provided with spatial audio, such that the spatial audio is perceived as originating from real world objects visible to the user and/or from augmented reality graphics overlaid over the user's view. Communication between electronic devices may use spatial audio to present the aural scene perceived by a first user to a second user remote from the first user.

Figure 1:
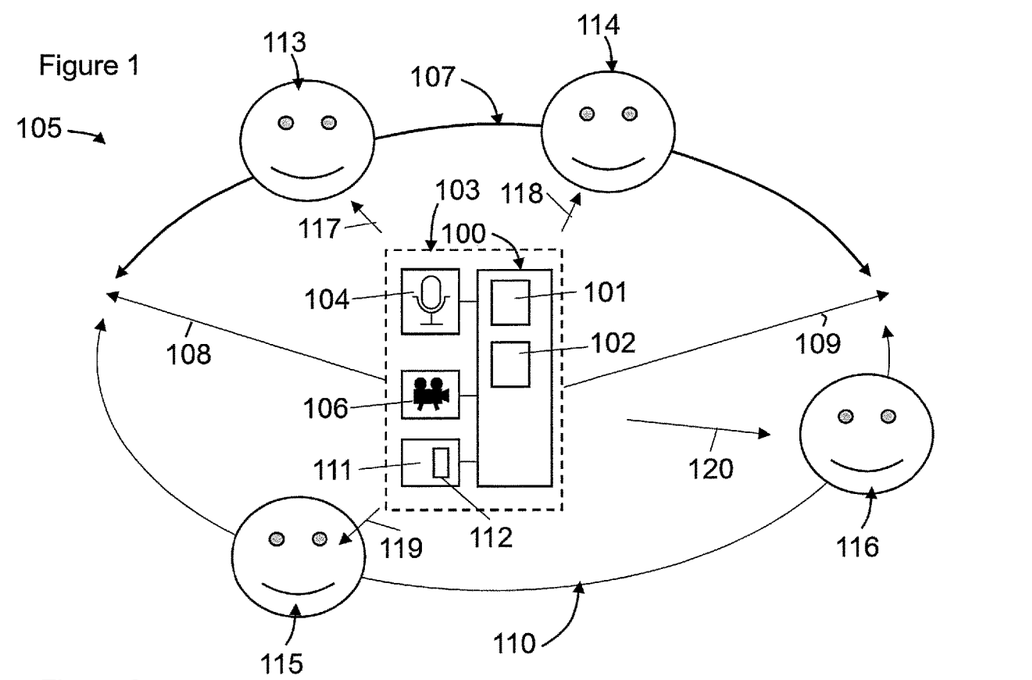
FIG. 1 illustrates an example apparatus for control of at least one audio capture property, the apparatus shown as part of an electronic device or "capture device" in a space with audio sources.

FIG. 1 shows an example apparatus 100 configured to provide for control of at least one audio capture property for a selected one of one or more audio sources. The apparatus 100 comprises means, such as a processor 101 and memory 102, to receive spatial audio data and provide for control of the audio capture property. In this and one or more examples, the apparatus 100 may comprise part of an electronic device 103, such as a smartphone or tablet computer. The electronic device 103 may comprise an embodiment of a capture device that is configured to receive spatial audio data and/or video imagery.

The apparatus 100 is configured to receive spatial audio data from one or more microphones 104. In one or more examples, the microphones 104 may be part of the electronic device 103 but in other examples may be separate therefrom. The one or more microphones 104 may comprise at least three microphones arranged, for example, as a microphone array for capturing spatial audio data. The apparatus 100 or the electronic device 103 may be configured to process the audio captured from the microphones 104 to generate the associated directional information. In one or more examples, tracking of audio sources in the space 105 around the electronic device 103 may be used to generate the directional information.

The apparatus 100 is configured to receive video imagery from a camera 106. In one or more examples, the camera may be part of the electronic device 103 but in other examples may be separate therefrom. The camera has a field of view 107 of the space 105 represented by the arrow between a first edge 108 of the field of view and a second edge 109 of the field of view. The field of view 107 of the camera 106 is smaller than the spatial extent of the space 105 from which the spatial audio data is captured by the microphones 104. Thus, there is a region 110 of the space 105 that is outside the field of view 107 of the camera 106. The electronic device 103 may be termed a "capture device" as it used to capture the spatial audio data and the video imagery. However, if the camera 106 and microphones 104 are separate from or independent of the electronic device 103, the camera 106 and microphones 104 may be collectively considered to comprise the capture device.

The apparatus 100 may be configured to provide for display by providing signalling to a display 111. The display 111 may be associated with a touch sensitive user input device 112 that provides for touch screen input to be provided to a user interface presented on the display 111. It will be appreciated that other user input functionality may be provided by the apparatus 100 or by the electronic device 103 for use by the apparatus 100.

While in this example the apparatus 100 is shown as part of the electronic device 103 and possibly sharing hardware resources, such as the processor 101, memory 102, camera 106, display 111 and the microphones 104 with the electronic device 103, in other embodiments the apparatus 100 may comprise part of a server (not shown) in communication with the electronic device 103 or in communication with the camera 106, microphone 104 and display 111 whether they are part of the electronic device 103 or not. Thus, the apparatus 100 may utilize a communication element to receive the spatial audio data and video imagery and provide signalling to cause imagery to be displayed by the display.

In whichever way the apparatus 100 is embodied, such as in the form of a server or part of the electronic device 103, the apparatus 100 may comprise or be connected to the processor 101 and a memory 102 and may be configured to execute computer program code. The apparatus 100 may have only one processor 101 and one memory 102 but it will be appreciated that other embodiments may utilise more than one processor and/or more than one memory (e.g. same or different processor/memory types). Further, the apparatus 100 may be an Application Specific Integrated Circuit (ASIC).

The processor may be a general purpose processor dedicated to executing/processing information received from other components, such as from the microphones 104, the camera 106, and touch sensitive user input device 112 in accordance with instructions stored in the form of computer program code in the memory. The output signalling generated by such operations of the processor is provided onwards to further components, such as the display 111 or to an audio processing module configured to process the spatial audio data as instructed by the apparatus 100. In other examples, the apparatus 100 may include means to process the spatial audio data and may modify a spatial audio capture property.

The memory 102 (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example, the respective processors and memories are electrically connected to one another internally to allow for electrical communication between the respective components. In this example, the components are all located proximate to one another so as to be formed together as an ASIC, in other words, so as to be integrated together as a single chip/circuit that can be installed into an electronic device. In some examples one or more or all of the components may be located separately from one another.

In one or more examples, the apparatus 100 is configured to receive spatial audio data comprising audio captured from one or more audio sources in the space 105 extending around the electronic device 103. In the example of FIG. 1, there comprises four audio sources comprising a first and second audio source 113 and 114 within the field of view 107 of the camera 106 and a third and fourth audio source 115 and 116 outside the field of view 107 of the camera 106 (i.e. region 110). The apparatus 100 may be configured to recognise the first through fourth audio sources 113-116 as audio sources when they are currently generating audio. In other examples, the first through fourth audio sources 113-116 may be considered audio sources when it has been less than a predetermined silence-time since the audio source last generated audio. The silence-time may comprise up to 5, 10, 20, 30, 40, 50 or 60 second or more depending on user preferences. Thus, the apparatus 100 may be configured to analyse the captured audio and determine one or more audio sources therein based on whether the audio is currently audible or having been audible within the silence-time. In other examples, the apparatus may receive information that identifies where in the spatial audio data the audio sources are present. The spatial audio data further comprises the directional information indicative of at least the direction towards said one or more audio sources. Thus, the directional information may be indicative of a first direction 117 for the first audio source 113; a second direction 118 for the second audio source 114; a third direction 119 for the third audio source 115; and a fourth direction 120 for the fourth audio source 116. It will be appreciated that the spatial audio data may be encoded in many different ways and the directions 117-120 may be recorded as metadata or the audio itself may be encoded to be indicative of the directions 117-120 among other techniques.

As mentioned above, the apparatus 100 may be configured to receive video imagery captured by the camera 106 of the electronic device 103, wherein the spatial extent of the space 105 from which the spatial audio data is captured is greater than the field of view 107. Thus, the audio from the third and fourth audio sources 115 and 116 feature in the spatial audio data but imagery of the third and fourth audio sources 115 and 116 does not feature in the video imagery at a given time. It will be appreciated that the electronic device 103 may be moved around the space 105 while the video imagery and spatial audio data is captured such that the field of view falls upon other audio sources over time. Thus, the audio sources that are within the field of view 107 may change over time.

Figure 2:
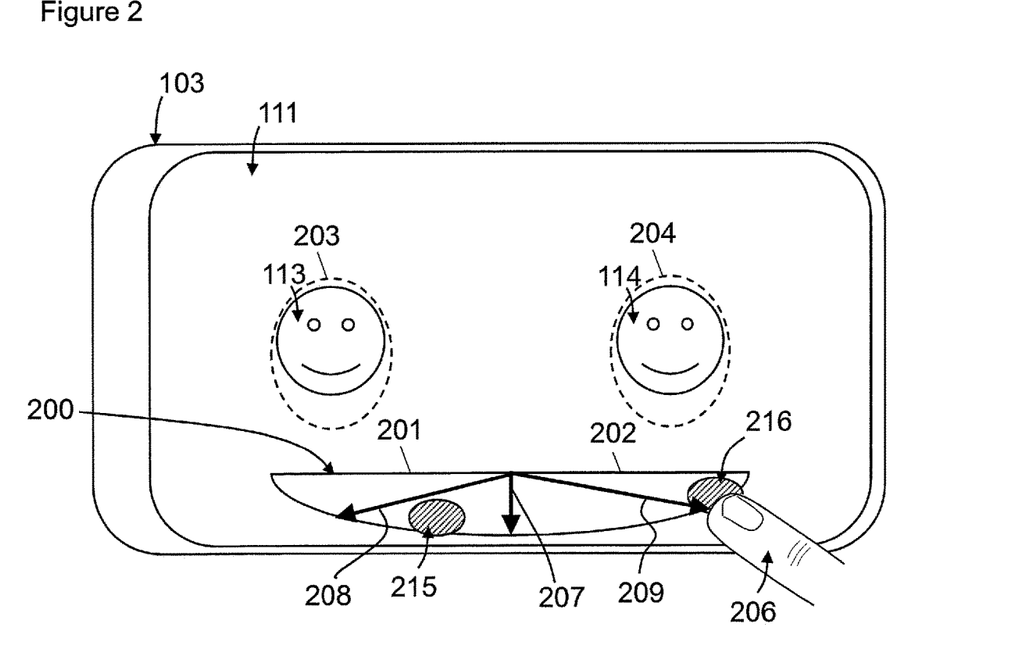
FIG. 2 shows a first example view of a display showing an interface based on signalling from the apparatus.

Example FIG. 2 shows the electronic device 103 and the display 111 thereof with a user interface presented thereon. The apparatus 100 is configured to provide for display of the video imagery from the camera 106. Thus, the apparatus 100 may provide signalling such that the video imagery captured within the field of view 107 of the camera 106 is presented on the display 111. It will be appreciated that the extent of what the camera captures may not be exactly the same as what is presented on the display 111. For example, the camera 106 may, by default, crop regions to match the resolution or aspect of the video imagery to the display 111. Accordingly, the field of view 107 of the camera 106 may be considered to comprise the field of view that is for presentation on the display 111. In the example of FIG. 2, the first audio source 113 is visible in the video imagery provided for presentation on the display 111 as well as the second audio source 114.

Example FIG. 2 shows a first example of an out-of-view graphic 200. The out-of-view graphic 200 comprises a graphical element or image that is displayed to represent the spatial extent of the space 105 outside the field of view 107. In particular, it may represent the extent of the space 105 from which spatial audio data is captured that is outside the field of view 107, such as only that part of the space 105 that is outside the field of view. Thus, audio sources that appear in the video imagery are not represented on the out-of-view graphic 200. In one or more examples, the out-of-view graphic 200 may represent more than just the space 105 outside the field of view 107 and may include parts that represent parts of the space 105 within the field of view 107.

In this and other examples, the out-of-view graphic 200 comprises a sector of an ellipse, such as half an ellipse. Thus, an ellipse or circle may be used to represent the 360 degrees of space 105 around the electronic device 103 and the half ellipse or other sectorial portion may represent the region 110 of the space 105 outside the field of view 107. In one or more examples, the out-of-view graphic 200 has a first radial portion 201 that represents a direction that corresponds to at least the first edge 108 of the field of view 107 and a second radial portion 202 that represents a direction that corresponds to at least the second edge 109 of the field of view 107 opposite the first edge 108. Given the out-of-view graphic 200 represents the outside the field of view 107 part of the space 105. Positions within the out-of-view graphic can be used to represent the direction from which the audio of the audio sources 115, 116 is received.

To provide for control of the audio capture property of an audio source selected based on its position, which is shown on the display 111, the apparatus 100 may associate a region/part of the displayed video imagery or out-of-view graphic 200 with each of the one or more audio sources, which themselves may be determined from the directional information. Thus, for audio sources 113, 114 within the field of view 107, the apparatus 100 may associate regions 203, 204 of the video imagery with the audio sources 113,114 or the direction towards the audio source. For third and fourth audio sources 115, 116 outside the field of view 107, the apparatus 100 may associate a part of the out-of-view graphic 200, shown as markers 215 and 216, that corresponds to the direction towards the audio sources 115, 116. The marker 215 therefore represents the location or direction towards the third audio source 115 and the marker 216 represents the location or direction towards the fourth audio source 116.

The apparatus 100 may be configured to receive user input. In this example, the user input may be provided by user input at the touch sensitive user input device 112. It will be appreciated that other user input methods may be used, such as eye gaze location or movement of a cursor or pointer by way of a controller. The position of the user input on the display 111 may select a region of the video imagery or select a part of the out-of-view graphic 200, such as one of the regions 203, 204 or one of the markers 215 or 216. Given the association made for those regions 203, 204 and markers 215, 216, the apparatus 100 is provided with a selection of the audio from one of the first to fourth audio sources 113-116. It will be appreciated that in other examples, multiple selections may be made. In example FIG. 2, the user, shown by finger 206 has selected the marker 216 and therefore the audio of the fourth audio source 116 in the spatial audio data.

The apparatus 100 may be configured to provide for control of at least one audio capture property, wherein the control is specific to the selected one of said one or more audio sources 113-116.

Thus, the apparatus 100 may be configured to receive spatial audio data that represents audio captured from a greater range of directions than the spatial extent of co-received video imagery. The electronic device 103 or, more generally, the incoming spatial audio data and video imagery, therefore has the technical limitation that while the audio of the audio sources 113-116 is captured an equivalent extent of visual imagery cannot be captured without a multi-camera arrangement, such as a spherically arranged camera arrangement. Such a multi-camera arrangement may limit the instances in which spatial audio data may be captured because such multi-camera arrangements are typically bulky and cumbersome. Thus, the apparatus 100 provides for processing of the spatial audio data and video imagery and the presentation of an interface in a way that may overcome the problems associated with the control of spatial audio capture with the technical limitation of a smaller field of view of camera 106 combined with a larger field of capture of spatial audio data.

The out-of-view graphic 200 is shown with several arrows that may be labelled to help the user to understand what is represented. For example, arrow 207 may be labelled with 180° to show it represents a direction 180° from a straight-ahead direction of the video imagery. Similarly, the other arrows 208 and 209 may be labelled 135° and 225° to show the directions that are represented by those parts of the out-of-view graphic 200.

In one or more examples, the apparatus 100 may provide for presentation of the spatial audio data by an audio presentation device (not shown), such as headphones. In other examples, the presentation of the spatial audio data may not be necessary given a user of the electronic device 103 will be able to hear the audio that is captured as the spatial audio data first-hand. Nevertheless, the presentation of the spatial audio data may be advantageous so that a user can appreciate the effect of the change they instructed by the user input on the audio capture property. Thus, in one or more examples, the apparatus may be configured to provide for presentation of only the audio from audio sources that has had an audio capture property modified.

The location of the markers 215, 216 on the out-of-view graphic 200 may be updated live or periodically to represent the current position of the audio sources that are out of the field of view 107. If an audio source moves from region 110 to be within the field of view 107, its associated marker may be removed from display. Likewise, if an audio source moves to the region 110 then the apparatus 100 may add a marker to the out-of-view graphic 200. In one or more examples, a marker(s), visually similar to the markers 215, 216 or different, may be presented at the region or regions 203, 204 of the video imagery that correspond to the direction or directions towards the one or more audio sources within the field of view 107. Thus, the apparatus may provide for presentation of markers to indicate that the apparatus 100 considers the person in the video imagery as a first or second audio source 113, 114 at that current time, as well as show the position of the audio source (in addition to the audio source featuring in the video imagery). In one or more examples, the markers used for audio sources in the video imagery may comprise an outline or translucent shading to mark the relevant region 203, 204.

In one or more examples, the apparatus 100 is configured to provide for control of the audio capture property live as the spatial audio data and the video imagery is captured. In one or more examples, the spatial audio data and video imagery is captured at the same time and recorded and the apparatus is provided with the pre-recorded spatial audio data and pre-recorded video imagery.

The control of the audio capture property may be provided in various ways. In one or more examples, the apparatus 100 may be configured to control how the spatial audio data is captured, such as by modifying the arrangement of the microphone 104 or parameters of the microphone 104, such as the gain applied to the audio sources or the directional focus of the microphone(s). In one or more examples, the apparatus 100 may be configured to control how the spatial audio data is recorded and therefore may provide for audio processing of the spatial audio data and record the spatial audio data with modification of the audio capture property applied thereto. An aim of the control of the audio capture property may be to provide for emphasis of audio from a particular audio source 113-116 or direction.

In one or more examples, the control of the audio capture property is provided by use of beam forming technique. The beam forming technique may be used to capture a monophonic audio stream of the selected audio source. The monophonic audio stream may be specific to the selected audio source while the other audio sources may be collectively recorded in a common stream. The beam forming technique may provide spatial audio data that has audio sources in the selected direction relatively emphasized and/ or the audio sources in other directions relatively attenuated. An example of a beam forming technique is the delay-sum beam forming technique that utilises a microphone array of at least three microphones to focus the microphone on the capture of audio from the selected audio source or direction. Alternatively, the beam forming technique may comprise parametric spatial audio processing to form a beamformed output, where certain region(s) or directions of the spatial audio are emphasized or "extracted" from a spatial audio field representative of the audio received from the space 105.

Accordingly, the user input that identifies a position on either of the video imagery and the out-of-view graphic 200 may cause the apparatus 100 to control the audio capture property for a selected audio source, such as by beam forming.

In one or more examples, the control of at least one audio capture property comprises the means being configured to capture or record the selected one audio source 116 with a greater volume gain relative to a volume gain applied to the audio of the other audio sources 113, 114, 115 of the spatial audio data. Thus, audio processing to increase the volume level may be selectively applied to the audio from the direction of the fourth audio source 116. It will be appreciated that in other examples, rather than the volume gain, the audio capture property may comprise the quality that the audio from the selected audio source/direction is captured. Thus, a higher bit rate may be used to record the audio from the selected audio source 116 than the bit rate used for the other audio of the spatial audio data.

In the examples described, it is mentioned that the control of the audio capture property may be applied to audio received from a selected direction or to audio from a selected audio source. The two may be considered interchangeable in one or more embodiments. Nevertheless, the apparatus 100 may be configured to identify the direction towards audio sources and thereby the presence of an audio source in the spatial audio data. The apparatus 100 may be configured to determine from which direction, using the directional information, audio that has a volume above a predetermined threshold is received. If audio above the threshold is received from a particular direction, then that direction may be determined to point towards an audio source.

The dominant sound sources in the space 105 may be located using different techniques. An example is the steered-response power phase transform (SRP-PHAT). This algorithm can be understood as a beamforming-based approach that searches for the candidate positions or direction of audio sources an which maximizes the output of a steered delay-and-sum beamformer to "scan" the space 105. In one or more examples, to limit the computational burden of the method, the front, back and/or sides of the electronic device 103 may be divided to fixed size sectors, and fixed beam formers be designed for each, formed of microphones or microphone arrays, collectively shown at 104. It will be appreciated that filtering may be applied to identify only audio sources that meet the desired threshold. In one or more examples, the apparatus may be configured to apply deep learning methods or voice activity detection to determine when an audio source is active and then search for its location/direction via beamforming means, such as SRP-PHAT. When the location is determined the association can be made and or the marker 215, 216 placed at the appropriate point on the out-of-view graphic 200. In one or more examples the apparatus 100 may apply a threshold duration during which the audio source needs to be active for it to be detected as an audio source. This may help to filter out short duration sounds, which may be considered unwanted noises.

Figure 3:
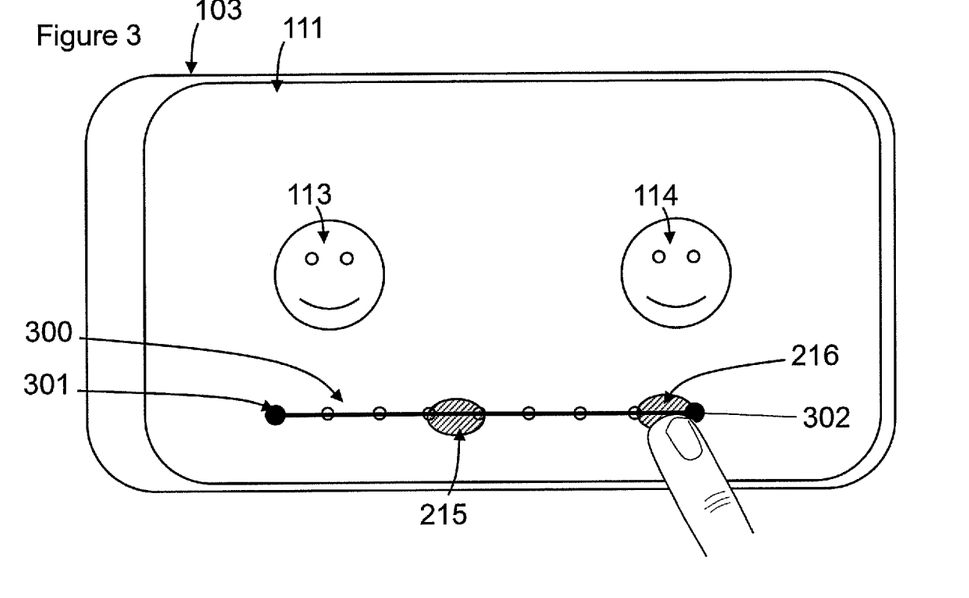
FIG. 3 shows a second example view of a display showing an interface based on signalling from the apparatus.

Example FIG. 3 shows an alternative embodiment of the out-of-view graphic 300. Example FIG. 3 is similar to example FIG. 2 and therefore the same reference numerals have been used other than for the out-of-view graphic 300. Thus, in this example, the out-of-view graphic comprises a line wherein the position along the line from one end 301 thereof to the other end 302 represents the direction from which the audio of the audio source is received in region 110 from a direction that corresponds to at least the first edge 108 of the field of view 107 to a direction that corresponds to at least the second edge 109 of the field of view 107 opposite the first edge.

The markers 215 and 216, as before, are provided for display on the line to represent the location of the audio sources in the space 105 outside the field of view 107. In this example, only the azimuth direction around the microphone 104 is represented. However, in other examples, the spherical position of the audio sources 113-116 may be depicted, i.e. with the height above or below a horizontal plane extending around the electronic device 103.

Figure 4:
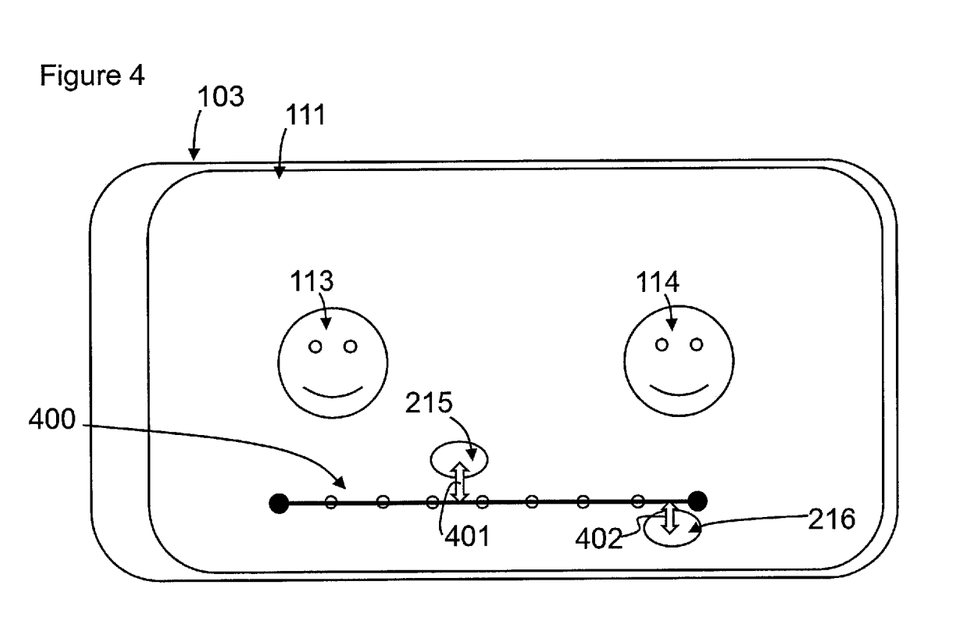
FIG. 4 shows a third example view of a display showing an interface based on signalling from the apparatus.

Thus, with reference to example FIG. 4, in one or more examples, the out-of-view graphic 400 comprises a line wherein the position along the line from one end thereof to the other end represents an azimuth direction from which the audio of the audio source is received from an azimuth direction that corresponds to at least the first edge 108 of the field of view to an azimuth direction that corresponds to at least a second edge 109 of the field of view opposite the first edge and wherein a distance 401,402 above or below the out-of-view graphic 400 (e.g. line) corresponds to an elevation direction from which the audio of the audio source 115, 116 is received. Thus, marker 215 representing the third audio source 115 is shown centrally between the ends of the line and above the line by distance 401 indicating that the audio is received from behind and above the microphone 104. Further, marker 216 representing the fourth audio source 116 is shown below the line by distance 402 indicating that the audio is received from the right and above the microphone 104. It will be appreciated in some examples, that the altitude may be provided only for audio sources higher than the horizontal plane or only lower than the horizontal plane.

The user input has been described as causing for the control of the audio capture property, which may be provided by application of a predetermined audio focus to the audio source, such as by audio processing or beam forming. In one or more examples, the degree to which the audio processing or beam forming or other control is applied may be controllable. The apparatus 100 may be configured to provide an effective way of both selecting and controlling to what audio the control is applied and how the audio capture property is controlled.

Figure 5:
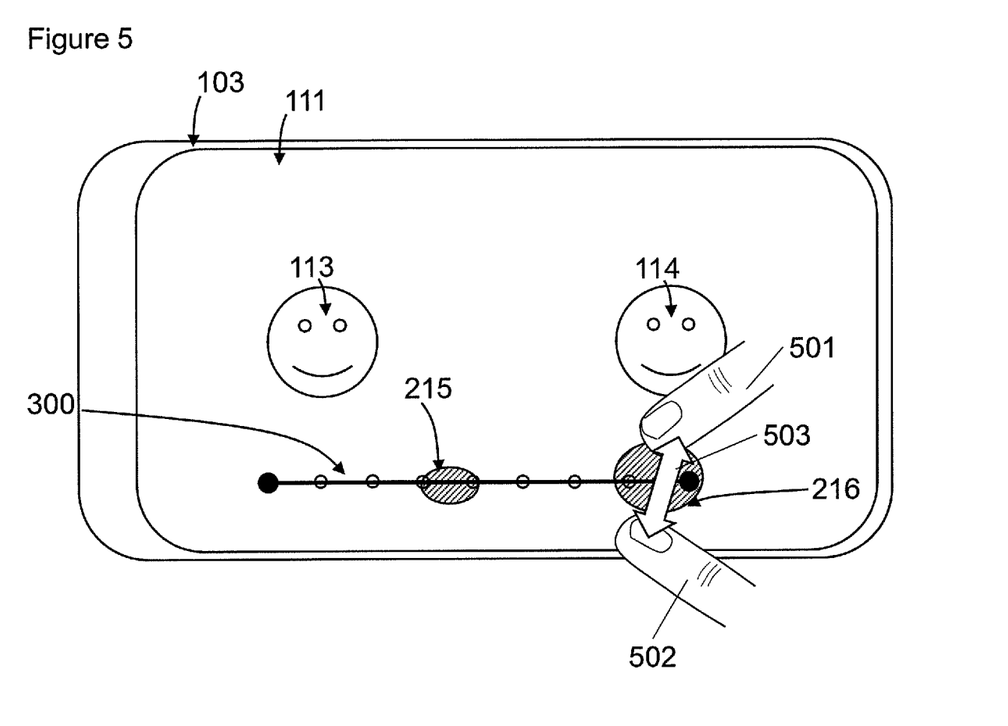
FIG. 5 shows a fourth example view of a display showing an interface based on signalling from the apparatus with a user providing a user input comprising a pinch gesture.

Example FIG. 5 is substantially the same as example FIG. 4 and the same reference numerals have been applied. In one or more examples, the apparatus 100 may be configured to receive a pinch gesture. FIG. 5 shows two fingers 501 and 502 of the user performing the pinch gesture on one of the markers 216. It will be appreciated that the pinch gesture may be applied to the other marker 215 or to the audio sources 113, 114 that are visible in the video imagery.

The apparatus 100 may be configured to provide for modifying said audio capture property by application of a beam forming technique having a degree related to a size 503 of the pinch gesture. It will be appreciated that the pinch gesture may be used to select one of the audio sources as well as control the degree of change to the audio capture property. In one or more examples, the control of the audio capture property may be performed during application of the pinch gesture to "preview" the final effect. In one or more examples, the size 503 may be determined when the pinch gesture is complete, and the user's fingers are removed from the display 111. In summary, the user input may comprise a pinch gesture on the touch sensitive user input device 112 at a location (e.g. of marker 216) that selects the region of the video imagery or the part of the out-of-view graphic and controls the degree to which the audio capture property is modified.

In terms of the application of beam forming technique, the size 503 of the pinch gesture may determine the degree to which the audio focus is dominant in the spatial audio data relative to the other spatial audio data. The pinch gesture may, for example, control beamwidth or maximum gain that the beam forming technique provides. In one or more examples, the beamwidth is the width of the beam forming technique in degrees of the sector in which audio sources are amplified and outside which audio sources are attenuated (e.g. relative to the amplified sources). In one or more examples, the maximum gain is the decibel difference of a maximally amplified sound source to a maximally attenuated sound source.

The apparatus may be configured to provide user feedback to the pinch gesture by controlling the size of the marker that represents the audio source selected by the pinch gesture. Thus, the marker 216 is shown larger than the marker 215 because it has caused the audio of the associated fourth audio source 116 to be focused on by beam forming or otherwise modified.

Figure 6:
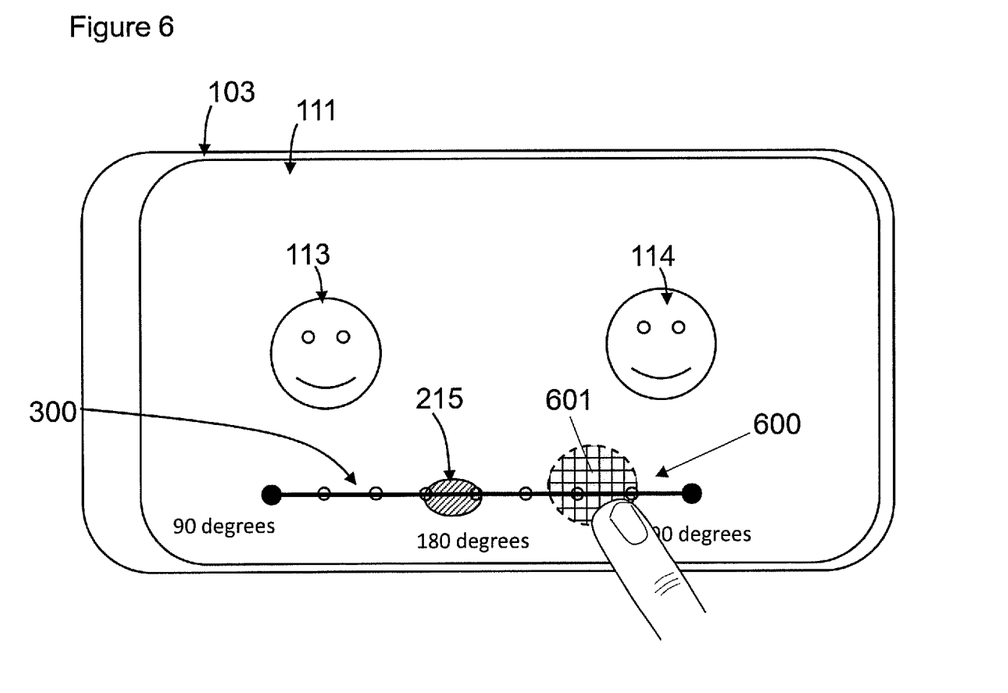
FIG. 6 shows a fifth example view of a display showing an interface based on signalling from the apparatus with the user providing a user input to select part of the out-of-view graphic.

Example FIG. 6 shows the user input applied to a part 600 of the out-of-view graphic 300 at which there is no marker and therefore no audio source. It will be appreciated that the user input could have been applied to a region of the video imagery at which there is not an associated audio source. In response to such a user input the apparatus 100 may be configured to provide for display of a second marker 601 to indicate the absence of an audio source in the direction that corresponds to the selected region of the video imagery or the part of the out-of-view graphic 300. The colour or patterning or appearance of the second marker 601 may be different to the markers 215, 216.

Figure 7:
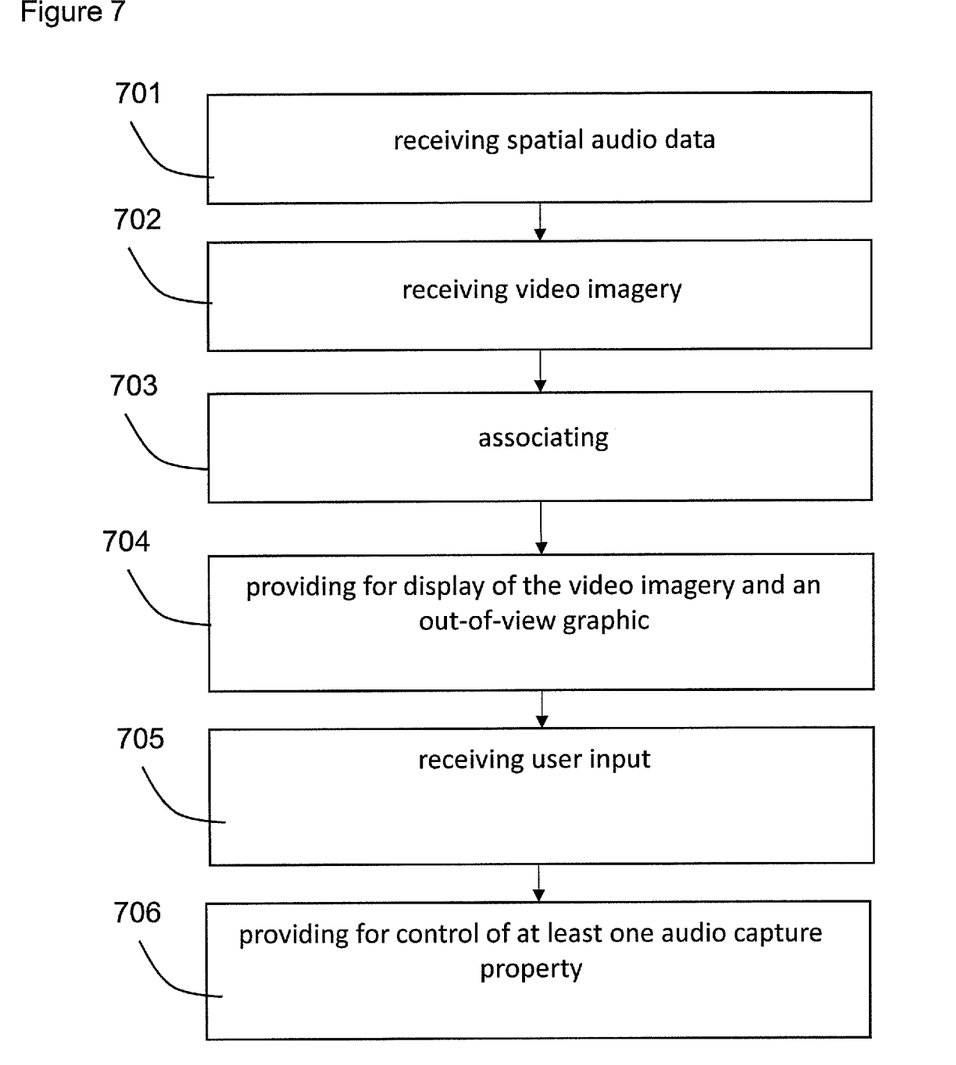
FIG. 7 shows a flowchart illustrating an example method.

FIG. 7 shows a flow diagram illustrating the steps of, receiving 701 spatial audio data comprising audio captured from one or more audio sources in a space extending around a capture device and directional information indicative of at least the direction towards said one or more audio sources, wherein the spatial audio data is captured by said capture device;

receiving 702 video imagery captured by a camera of the capture device, the video imagery having a field of view, wherein the extent of the space from which the spatial audio data is captured is greater than the field of view;

associating 703 each of the one or more audio sources, determined from the directional information, with, for audio sources within the field of view, a region of the video imagery that corresponds to the direction towards the audio source, and, for audio sources outside the field of view, a part of an out-of-view graphic that corresponds to the direction towards the audio source, the out-of-view graphic indicative of the spatial extent of the space outside the field of view;

providing 704 for display of the video imagery on a display along with the out-of-view graphic;

receiving 705 user input to select a region of the video imagery or a part of the out-of-view graphic;

providing 706 for control of at least one audio capture property of a selected one of said one or more audio sources, wherein said selected one of said one or more audio source comprises one of the one or more audio sources that is associated with the region or part selected by the user input.

The method may be characterized by any of the features described above described in relation to the apparatus.

Figure 8:
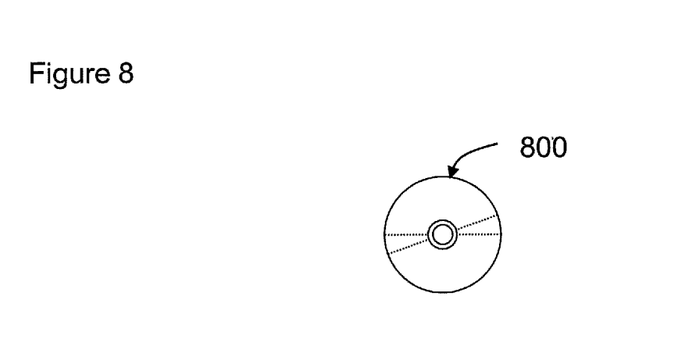
FIG. 8 shows a computer readable medium.

FIG. 8 illustrates schematically a computer/processor readable medium 800 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
at least one processor; and
at least one memory including computer program code,
the at least one memory and the computer program code configured to, with the at least one processor, cause the apparatus to perform at least the following:
receive spatial audio data comprising audio captured from audio sources in a space extending around a capture device and directional information indicative of at least a direction towards said audio sources, wherein the spatial audio data is captured by said capture device;
receive video imagery captured by a camera of the capture device, the video imagery having a field of view, wherein the extent of the space from which the spatial audio data is captured is greater than the field of view;
associate each of one or more audio sources, determined from the directional information, with, for audio sources within the field of view, a region of the video imagery that corresponds to the direction towards the audio source, and, for audio sources outside the field of view, a part of an out-of-view graphic that corresponds to the direction towards the audio source, the out-of-view graphic indicative of the spatial extent of the space outside the field of view;
provide for display of the video imagery on a display along with the out-of-view graphic;
receive user input to select the region of the video imagery or the part of the out-of-view graphic; and
provide for control of at least one audio capture property of a selected one of said one or more audio sources, wherein said selected one of said one or more audio sources comprises one of the one or more audio sources that is associated with the region or the part selected by the user input,
wherein the out-of-view graphic indicative of the spatial extent of the space outside the field of view further comprises at least one of:
a line, wherein the position along the line from one end thereof to the other represents the direction from which the audio of the audio sources that are associated with the out-of-view graphic is received, wherein the one end of the line represents a direction that corresponds to at least a first edge of the field of view and the other end of the line represents a direction that corresponds to at least a second edge of the field of view opposite the first edge; or
a sector of an ellipse, wherein the position within the sector represents the direction from which the audio of the audio sources that are associated with the out-of-view graphic is received, wherein a first portion of the sector represents a direction that corresponds to at least a first edge of the field of view and a second portion of the sector represents a direction that corresponds to at least a second edge of the field of view opposite the first edge.

2. The apparatus of claim 1, further configured to cause to provide for display of a marker at one or more of:
the part or parts of the out-of-view graphic that correspond to the direction or directions towards the one or more audio sources; or
the region or regions of the video imagery that correspond to the direction or directions towards the one or more audio sources.

3. The apparatus of claim 1, wherein the control of the at least one audio capture property further comprises, provide signalling to cause the capture or recordal of the selected one audio source using a beam forming technique.

4. The apparatus of claim 3, wherein the beam forming technique comprises at least one of: a delay-sum beamformer technique or a parametric spatial audio processing technique in which the audio of the selected audio source is emphasized.

5. The apparatus of claim 1, wherein the control of the at least one audio capture property comprises at least one of:
capture or record the selected one audio source with a greater volume gain relative to a volume gain applied to other audio of the spatial audio data;
capture or record the selected one audio source with a greater quality relative to a quality applied to other audio of the spatial audio data; or
capture or record the audio of the selected one audio source as an audio stream separate from other audio of the spatial audio data.

6. The apparatus of claim 1, further configured to cause to determine the one or more audio sources by determining from which direction, using the directional information, audio that has a volume above a predetermined threshold is received.

7. The apparatus of claim 1, wherein the out-of-view graphic indicative of the spatial extent of the space outside the field of view is representative of a plane around the capture device wherein a position of a presented marker relative to the out-of-view graphic represents an azimuth direction from which the audio of the audio source is received and wherein a position of the presented marker depicted a distance above or below the out-of-view graphic corresponds to an elevation direction from which the audio of the audio source is received above or below said plane.

8. The apparatus of claim 1, further configured to cause to, based on the user input comprising a tap on a touch sensitive input device at a location that selects the region of the video imagery or the part of the out-of-view graphic, provide for control of at least one audio capture property by modifying said audio capture property by an application of a beam forming technique that focusses on the region of the space corresponding to the selected region or part.

9. The apparatus of claim 1, further configured to cause to, based on the user input comprising a pinch gesture on a touch sensitive input device at a location that selects the region of the video imagery or the part of the out-of-view graphic, provide for control of at least one audio capture property by modifying said audio capture property by application of a beam forming technique having a degree angle related to a size of the pinch gesture.

10. The apparatus of claim 1, further caused to, based on the received user input selecting the region of the video imagery or the part of the out-of-view graphic where there is not an associated audio source, provide for display of a second marker to indicate the absence of an audio source in the direction that corresponds to the selected region of the video imagery or a part of the out-of-view graphic.

11. The apparatus of claim 1, further configured to cause to provide for one or both of presentation and recordal of the spatial audio data with the selected audio source having the controlled audio capture property.

12. The apparatus of claim 1, further configured to cause to identify one or more audio sources within the spatial audio data as active audio sources based on a time that respective ones of the one or more audio sources last generated audio satisfying a predetermined silence-time.

13. A method, the method comprising:
receiving spatial audio data comprising audio captured from one or more audio sources in a space extending around a capture device and directional information indicative of at least a direction towards said one or more audio sources, wherein the spatial audio data is captured by said capture device;
receiving video imagery captured by a camera of the capture device, the video imagery having a field of view, wherein the extent of the space from which the spatial audio data is captured is greater than the field of view;
associating each of one or more audio sources, determined from the directional information, with, for audio sources within the field of view, a region of the video imagery that corresponds to the direction towards the audio source, and, for audio sources outside the field of view, a part of an out-of-view graphic that corresponds to the direction towards the audio source, the out-of-view graphic indicative of the spatial extent of the space outside the field of view;
providing for display of the video imagery on a display along with the out-of-view graphic;
receiving user input to select the region of the video imagery or the part of the out-of-view graphic; and
providing for control of at least one audio capture property of a selected one of said one or more audio sources, wherein said selected one of said one or more audio sources comprises one of the one or more audio sources that is associated with the region or part selected by the user input,
wherein the out-of-view graphic indicative of the spatial extent of the space outside the field of view further comprises at least one of:
a line, wherein the position along the line from one end thereof to the other represents the direction from which the audio of the audio sources that are associated with the out-of-view graphic is received, wherein the one end of the line represents a direction that corresponds to at least a first edge of the field of view and the other end of the line represents a direction that corresponds to at least a second edge of the field of view opposite the first edge; or
a sector of an ellipse, wherein the position within the sector represents the direction from which the audio of the audio sources that are associated with the out-of-view graphic is received, wherein a first portion of the sector represents a direction that corresponds to at least a first edge of the field of view and a second portion of the sector represents a direction that corresponds to at least a second edge of the field of view opposite the first edge.

14. The method of claim 13, further comprising providing for display of a marker at one or more of:
the part or parts of the out-of-view graphic that correspond to the direction or directions towards the one or more audio sources; or
the region or regions of the video imagery that correspond to the direction or directions towards the one or more audio sources.

15. The method of claim 13, wherein the control of the at least one audio capture property further comprises providing signalling to cause the capture or recordal of the selected one audio source using a beam forming technique.

16. The method of claim 13, wherein the control of the at least one audio capture property comprises at least one of:
capture or record the selected one audio source with a greater volume gain relative to a volume gain applied to other audio of the spatial audio data;
capture or record the selected one audio source with a greater quality relative to a quality applied to other audio of the spatial audio data; or capture or record the audio of the selected one audio source as an audio stream separate from other audio of the spatial audio data.

17. The method of claim 13, further comprising determining the one or more audio sources by determining from which direction, using the directional information, audio that has a volume above a predetermined threshold is received.

18. The method of claim 13, wherein the out-of-view graphic indicative of the spatial extent of the space outside the field of view is representative of a plane around the capture device wherein a position of a presented marker relative to the out-of-view graphic represents an azimuth direction from which the audio of the audio source is received and wherein a position of the presented marker depicted a distance above or below the out-of-view graphic corresponds to an elevation direction from which the audio of the audio source is received above or below said plane.

19. The method of claim 13, further comprising identifying one or more audio sources within the spatial audio data as active audio sources based on a time that respective ones of the one or more audio sources last generated audio satisfying a predetermined silence-time.

20. A non-transitory computer readable medium comprising program instructions stored thereon for performing at least the following:
receiving spatial audio data comprising audio captured from one or more audio sources in a space extending around a capture device and directional information indicative of at least a direction towards said one or more audio sources, wherein the spatial audio data is captured by said capture device;
receiving video imagery captured by a camera of the capture device, the video imagery having a field of view, wherein the extent of the space from which the spatial audio data is captured is greater than the field of view;
associating each of one or more audio sources, determined from the directional information, with, for audio sources within the field of view, a region of the video imagery that corresponds to the direction towards the audio source, and, for audio sources outside the field of view, a part of an out-of-view graphic that corresponds to the direction towards the audio source, the out-of-view graphic indicative of the spatial extent of the space outside the field of view;
providing for display of the video imagery on a display along with the out-of-view graphic;
receiving user input to select the region of the video imagery or the part of the out-of-view graphic; and
providing for control of at least one audio capture property of a selected one of said one or more audio sources, wherein said selected one of said one or more audio sources comprises one of the one or more audio sources that is associated with the region or part selected by the user input,
wherein the out-of-view graphic indicative of the spatial extent of the space outside the field of view further comprises at least one of:
a line, wherein the position along the line from one end thereof to the other represents the direction from which the audio of the audio sources that are associated with the out-of-view graphic is received, wherein the one end of the line represents a direction that corresponds to at least a first edge of the field of view and the other end of the line represents a direction that corresponds to at least a second edge of the field of view opposite the first edge; or
a sector of an ellipse, wherein the position within the sector represents the direction from which the audio of the audio sources that are associated with the out-of-view graphic is received, wherein a first portion of the sector represents a direction that corresponds to at least a first edge of the field of view and a second portion of the sector represents a direction that corresponds to at least a second edge of the field of view opposite the first edge.

* * * * *